March 13, 1934.　　　G. A. BIGGS　　　1,950,776
HYDRAULIC TURBINE
Filed Dec. 15, 1932　　3 Sheets-Sheet 1

INVENTOR
George A. Biggs
BY
ATTORNEYS

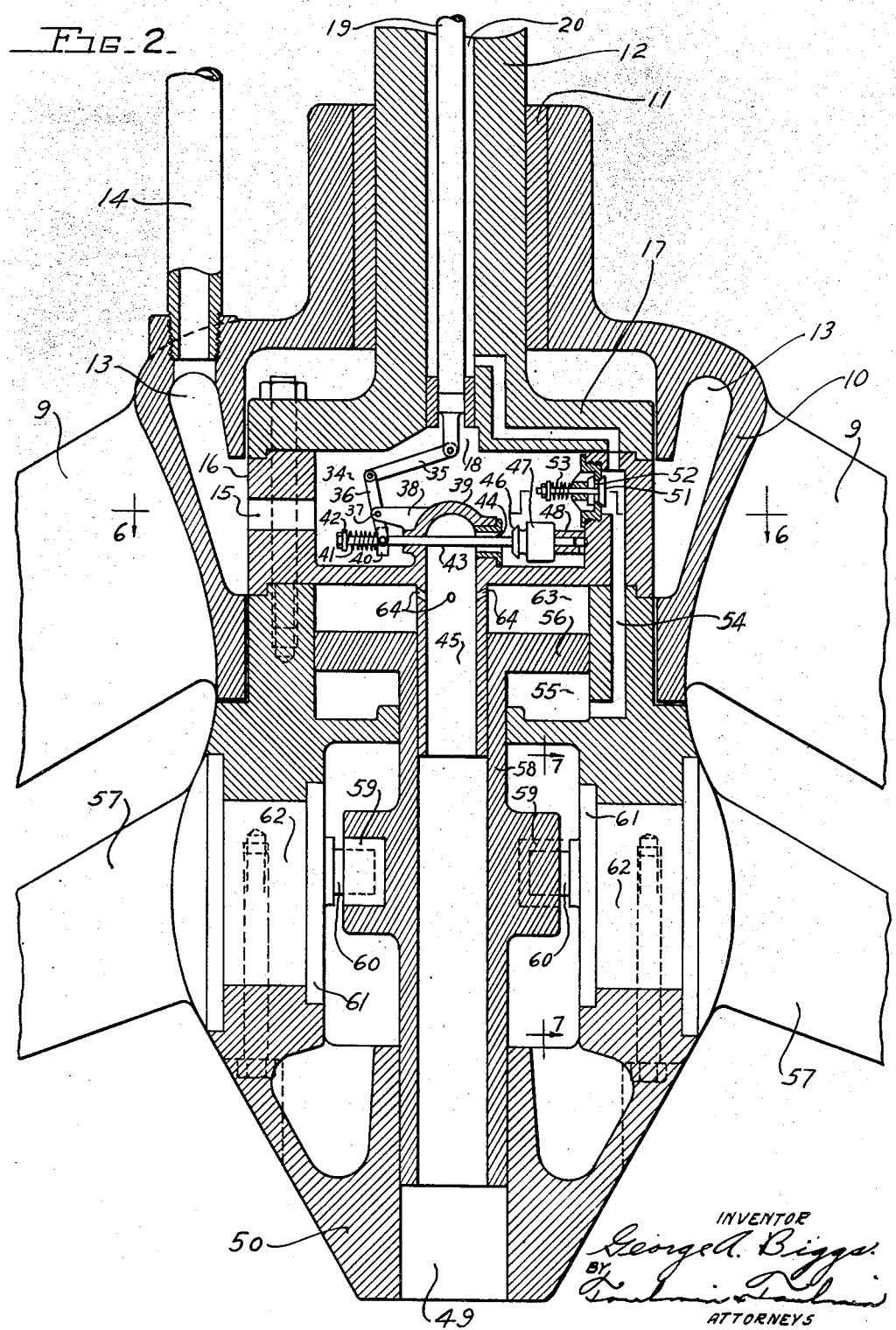

March 13, 1934.   G. A. BIGGS   1,950,776
HYDRAULIC TURBINE
Filed Dec. 15, 1932   3 Sheets-Sheet 3
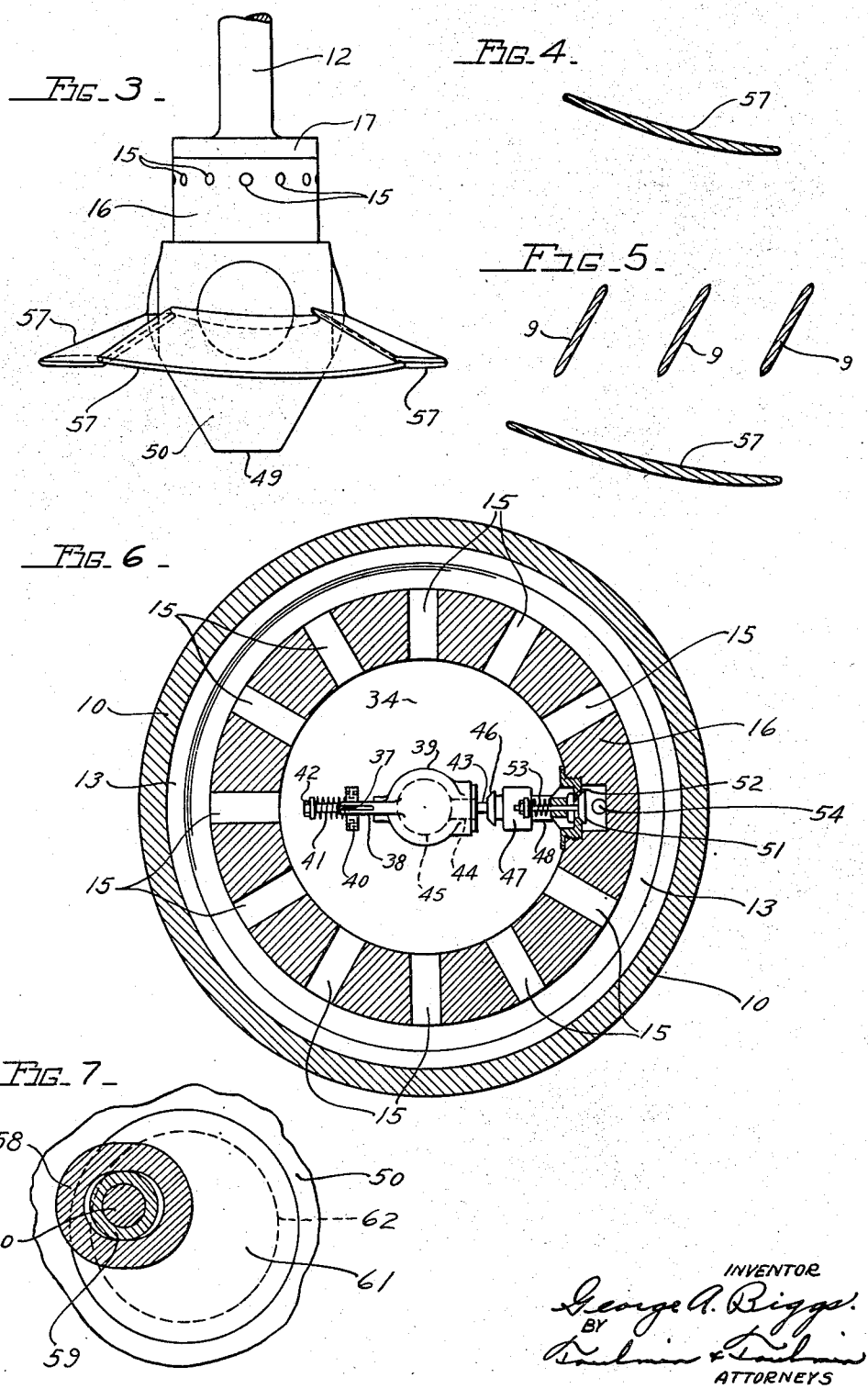

Patented Mar. 13, 1934

1,950,776

UNITED STATES PATENT OFFICE 1,950,776

HYDRAULIC TURBINE

George A. Biggs, Springfield, Ohio, assignor to The James Leffel & Company, Springfield, Ohio, a corporation of Ohio Application December 15, 1932, Serial No. 647,351

24 Claims. (Cl. 253—148)

My invention relates to hydraulic turbines.

It is the object of my invention to provide a hydraulic turbine with stationary guide vanes and adjustable runner vanes or blades; and, in particular, a self adjusting runner.

It is my object to provide a hydraulic turbine runner, the blades of which are self adjusting or self closing.

It is my object to provide a hydraulic turbine runner in which the blades are so balanced that, under the influence of the water passing over them, they tend to close and will close unless otherwise controlled and opened; and to provide hydraulic pressure preferably from the head waters above the turbine for controlling the closing and opening of the blades; and to provide, in addition thereto, centrifugally operated means for regulating the angular position of the blades in conjunction with such hydraulic pressure to thereby control the speed and power output.

It is my object to provide an intermittently opening valve for controlling the application of hydraulic pressure and the exhaust of hydraulic pressure which is being used to control the angular position of the runner blades, the rate of opening and closing of such valve being determined by the opening of the runner blades and thereby controlling the speed and power output.

It is a further object to provide in this connection means of adjusting, preferably from a remote point independently of the speed of rotation of the runner, this rate of opening and closing of the valve that, in turn, controls the application of the adjusting hydraulic pressure.

In other words, it is my object to provide means of setting the centrifugally operated governor mechanism in the hydraulic turbine runner so that it will not exceed a predetermined maximum speed and then permit the governor within the speed range thus determined to automatically adjust the application of the hydraulic pressure for adjusting the self closing turbine blades, such adjustment being effected according to the speed of the turbine which, in turn, by centrifugal force, regulates the application of the hydraulic pressure to maintain a control speed and power output as may be desired.

It is my object to provide hydraulic pressure from the head waters above the turbine adapted to maintain the runner blades open, the runner blades being so balanced as to be otherwise self closing; and to provide a centrifugally operated governor adapted to by-pass and exhaust the hydraulic fluid intermittently to maintain the runner blades at a predetermined angle in order to keep the speed and power output at a predetermined point and to use any excess speed to increase the amount of fluid by-passed in order to close down the runner blades to reduce the speed and power output if it becomes excessive above the normal determined by the setting of the governor.

Referring to the drawings:

Figure 2 is an enlarged vertical section through the governor mechanism and adjusting mechanism in the hub of the turbine runner;

Figure 3 is an end elevation showing the position of the runner blades when closed and adapted to cut off the fluid passing thereover through the draft tube;

Figure 4 is a section on the line 4—4 of Figure 1 showing in section a typical blade;

Figure 5 is a section on the line 5—5 of Figure 1 showing the relationship between the fixed guide vanes and the runner vanes;

Figure 6 is a section on the line 6—6 of Figure 2;

Figure 7 is a section on the line 7—7 of Figure 2;

Figure 1:
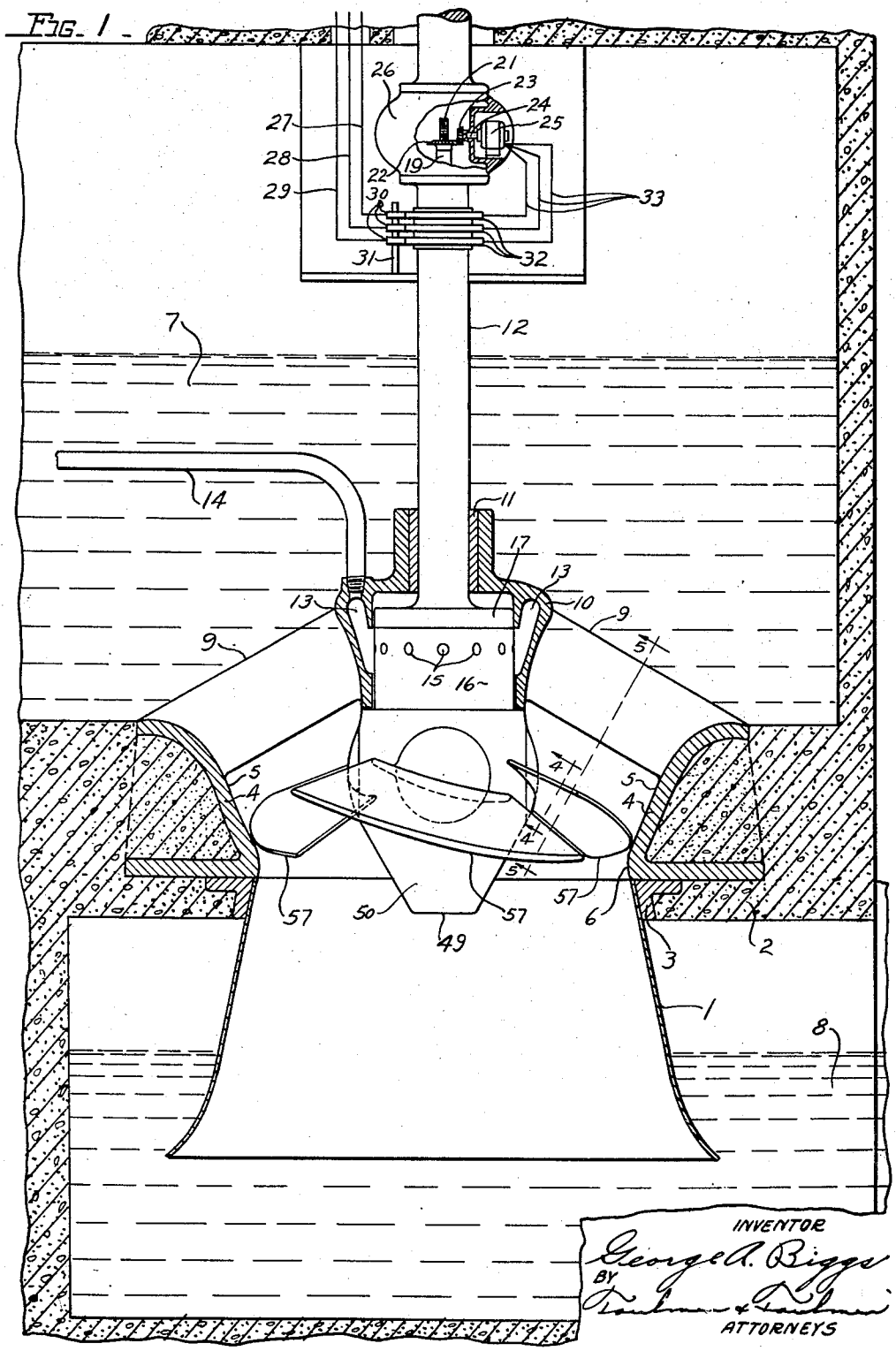
Figure 1 is a side elevation of the turbine runner and adjusting mechanism with the gate casing, foundation ring, inner and outer vane rings in section.

Referring to the drawings in detail, 1 is a draft tube set in the concrete 2 of the foundation, 3 designates a foundation ring upon which is mounted the outer guide vane ring 4 having an arcuate face 5 in alignment with the draft tube 1. This face 5 converges inwardly and downwardly to the point 6 from which point the guide vane ring and the draft tube expand downwardly and outwardly. Water is, therefore, led to the hydraulic turbine runner blades in a restricted column and after passing over the blades is conveyed away in an expanding, downwardly moving column. The head waters are generally designated at 7 and the tail waters in the general direction at 8.

The guide vane ring 4 carries a plurality of stationary guide vanes 9, the inner ends of which support an inner guide vane ring 10 in the shape of a hub which is provided with a bearing 11 for aligning the runner shaft 12. This hub 10 is provided with a chamber 13 to which head water fluid is delivered through the pipe 14. This fluid thus delivered under pressure enters the ports 15 of the governor casing 16 which is connected at its top to the head 17 on the runner shaft 12.

Governor adjusting mechanism

This governor casing communicates with the runner shaft through the port 18 in which reciprocates a governor adjusting rod 19 that passes through the passageway 20 in the runner shaft 12. The rod 19 has mounted on its upper end a screw 21 which is engaged and actuated by a worm gear 22 which in turn is actuated by the pinion 23 which in turn is mounted on the armature shaft 24 of the reversible motor 25. This gearing and the motor are mounted within an air chamber 26 which is carried on the runner shaft 12. Access to this air chamber from the governor casing is provided by the passageway 20 which communicates with the passageway 18 and thence with the air chamber 26.

The excess fluid in the pressure adjusting system, is therefore, cushioned by the air trapped in the air chamber 26. This compressed air in the chamber 26 creates a steadying effect on the hydraulic pressure in adjusting the turbine blades.

The motor 25 derives its current from the lines 27, 28 and 29 which are connected to the brushes 30 and the brush holder 31 which in turn engage the slip rings 32 that are connected by the wires 33 to the motor. It is thus possible to continuously adjust the gearing 21, 22 and 23 even though the turbine is running and to make that adjustment from any remote point desired.

Governor mechanism

Within the governor casing 16 is a chamber 34 into which projects the end of the shaft 19. This shaft is connected by a pitman 35 to a lever 36 pivoted at 37 on the arm 38 that is in turn mounted upon a cap 39 forming a part of the governor casing. The lower end of this lever is formed in an eye at 40 which engages one end of a spring 41, the other end of which abuts a head 42 on the valve rod 43. This valve rod passes through the head 39 tranversely and also through a port 44 in this head communicating with a passageway 45 within the head. This port is intermittently closed by a valve member 46 which carries the centrifugally operated weight 47. The extreme end of this valve stem 43 is supported within a sleeve 48 in the casing 16. This valve operates intermittently and its rate of operation intermittently is determined first by the compression or tension on the spring 41 which in turn is adjusted by the operation of the reversible motor 25 and secondly by the action of centrifugal force upon the weighted member 47 of the valve 46. Accordingly, the excessive speed of the turbine due to centrifugal force will tend to maintain the valve 46 open a greater portion of the time while this hydraulic ram valve 46 is operating if the speed is increased and a lesser amount of time as the speed decreases.

Hydraulic pressure is delivered through the pipe 14 and ports 15 into the chamber 34 and thus enters intermittently through the ram valve 46 into the passageway 45 and downwardly out the open bottom 49 of the runner hub 50. This intermittent by-passing through the by-pass passageway 45 relieves the pressure in the chamber 34 and determines the amount of pressure which would otherwise lift the spring seated valve 51 controlling the port 52. This valve is normally seated by the spring 53.

Adjusting mechanism for controlling the position of the runner buckets

It also determines the hydraulic pressure delivered through the passageway 54 into the chamber 55 behind the runner blade adjusting piston 56, the upward movement of which tends to open the runner blades 57. This is effected by the hollow piston rod 58 connected to the piston 56 having bearings 59 engaging the crank pins 60 eccentrically placed on the shaft heads 61 of the shaft 62 which furnish the bearing supports for the self closing buckets 57.

Fluid escapes from the chamber 55 around the sides of the piston 56 into the chamber 63 and thence through the ports 64 into the by-pass passageway 45. Thus, the hydraulic pressure enters through the pipe 14 into the chamber 13 downwardly through the passageway 54 into the chamber 55 pressing the piston 56 upwardly and opening the runner buckets or blades 57 which have a tendency to close. This will increase the speed and power output. The motor 25 has already been adjusted to limit this speed and output. The governor weight 47 with the valve 46 now begins to function to maintain the speed and power output within the limit thus established. The valve 46 acting intermittently as a hydraulic ram valve by-passes the water and its rate of opening and closing determines the opening of the runner blades as such by-passing of the water determines the effect of the water from the pipe 14 upon the piston 56.

As there is constant leakage around the piston 56 into the by-pass 45 through the port 64 a constant replenishment of fluid is necessary into the chamber 55 and any excess must be by-passed through the port 44 in order to maintain the predetermined speed and output within the limit established by the setting of the reversible motor 25. When the valve 46 closes the increased pressure resulting from the inertia of the moving column of water in the drive pipe 14 causes the valve 51 to open and admit water to the passageway 54 with the result heretofore described as to the action of the water in the chamber 55.

It will be understood that I desire to comprehend within my invention such modifications as may be necessary to adapt it to varying conditions and uses.

Having thus fully described my invention, what I claim as new and desire to secure by Letters Patent, is:

1. In a hydraulic turbine, a runner having a plurality of adjustable buckets adapted to be closed by the hydraulic fluid passing thereover to shut off the flow of fluid therethrough, means to open said buckets comprising a hydraulic cylinder and piston means to apply hydraulic pressure thereto to open the buckets, a by-pass for diverting said hydraulic pressure without opening the buckets, a centrifugally operated valve adapted to intermittently open to by-pass the fluid opening the buckets to maintain them at a predetermined degree of opening according to the speed of the turbine as desired.

2. In a hydraulic turbine, a runner having a plurality of adjustable buckets adapted to be closed by the hydraulic fluid passing thereover to shut off the flow of fluid therethrough, means to open said buckets comprising a hydraulic cylinder and piston means to apply hydraulic pressure thereto to open the buckets, a by-pass for diverting said hydraulic pressure without opening the buckets, a centrifugally operated valve adapted to intermittently open to by-pass the fluid opening the buckets to maintain them at a predetermined degree of opening according to the speed of the turbine as desired, and means adapted to set the maximum rate of opening of the by-pass to determine the maximum speed of the turbine.

3. In a hydraulic turbine, a runner having a plurality of adjustable buckets adapted to be closed by the hydraulic fluid passing thereover to shut off the flow of fluid therethrough, means to open said buckets comprising a hydraulic cylinder and piston means to apply hydraulic pressure thereto to open the buckets, a by-pass for diverting said hydraulic pressure without opening the buckets, a centrifugally operated valve adapted to intermittently open to by-pass the fluid opening the buckets to maintain them at a predetermined degree of opening according to the speed of the turbine as desired, and means adapted to set the maximum rate of opening of the by-pass to determine the maximum speed of the turbine, said centrifugally operated valve being located in the turbine hub and said setting means being located at a remote point from the hub.

4. In a hydraulic turbine, a runner having a plurality of adjustable buckets adapted to be closed by the hydraulic fluid passing thereover to shut off the flow of fluid therethrough, means to open said buckets comprising a hydraulic cylinder and piston means to apply hydraulic pressure thereto to open the buckets, a by-pass for diverting said hydraulic pressure without opening the buckets, a centrifugally operated valve adapted to intermittently open to by-pass the fluid opening the buckets to maintain them at a predetermined degree of opening according to the speed of the turbine as desired, and means adapted to set the maximum rate of opening of the by-pass to determine the maximum speed of the turbine, said governor operated valve being located in the turbine hub and said setting means being located at a remote point from the hub, comprising mechanically operated adjusting means and a remotely controlled, electrically operated adjuster for the adjusting means.

5. In combination, a hydraulic turbine, a runner, a plurality of adjustable buckets mounted thereon, a runner shaft having a passageway therein communicating at one end with the interior of the runner hub and having at its other end an air chamber, means of applying hydraulic pressure to the interior of said shaft and hub for controlling the position of the runner blades.

6. In combination, a hydraulic turbine, a runner, a plurality of adjustable buckets mounted thereon, a runner shaft having a passageway therein communicating with the interior of the runner hub, means of applying hydraulic pressure of the interior of said shaft and hub for controlling the position of the runner blades, an air chamber on said runner shaft communicating with the interior of the hub to form an air cushion for the hydraulic pressure therein.

7. In combination, a hydraulic turbine, a runner, a plurality of adjustable buckets mounted thereon, a runner shaft having a passageway therein communicating with the interior of the runner hub, means of applying hydraulic pressure to the interior of said shaft and hub for controlling the position of the runner blades, an air chamber on said runner shaft communicating with the interior of the hub to form an air cushion for the hydraulic pressure therein, a governor in said hydraulic chamber in the hub adapted to control the by-passing and application of the hydraulic pressure to the opening of the buckets to control the speed and power output of the runner.

8. In combination, a hydraulic turbine, a runner, a plurality of adjustable buckets mounted thereon, a runner shaft having a passageway therein communicating with the interior of the runner hub, means of applying hydraulic pressure to the interior of said shaft and hub for controlling the position of the runner blades, an air chamber on said runner shaft communicating with the interior of the hub to form an air cushion for the hydraulic pressure therein, a governor in said hydraulic chamber in the hub adapted to control the by-passing and application of the hydraulic pressure to the opening of the buckets to control the speed and power output of the runner, and means to form an accumulation chamber for said hydraulic pressure, exit from which by the hydraulic fluid controlling the turbine blades depends upon the operation of said governor.

9. In combination, a hydraulic turbine runner comprising a hub, adjustable buckets, a runner shaft, means of applying hydraulic pressure to the interior of said hub for adjusting the buckets, a by-pass for said hydraulic pressure and an intermittently operating by-pass valve, the rate of opening and closing of which is centrifugally controlled, and a centrifugally operated governor for effecting said centrifugal control according to the speed of the turbine runner in order to maintain a predetermined speed and power output of the turbine.

10. In combination, a hydraulic turbine runner comprising a hub, adjustable buckets, a runner shaft, means of applying hydraulic pressure to the interior of said hub for adjusting the buckets, a by-pass for said hydraulic pressure and an intermittently operating by-pass valve, the rate of opening and closing of which is centrifugally controlled, a centrifugally operated governor for effecting said centrifugal control according to the speed of the turbine runner in order to maintain a predetermined speed and power output of the turbine, a hydraulic accumulation chamber adjacent said governor operated valve and by-pass, a valve between said chamber and the hydraulically operated means for adjusting the runner blades.

11. In combination, a hydraulic turbine runner comprising a hub, adjustable buckets, a runner shaft, means of applying hydraulic pressure to the interior of said hub for adjusting the buckets, a by-pass for said hydraulic pressure and an intermittently operating by-pass valve, the rate of opening and closing of which is centrifugally controlled, a centrifugally operated governor for effecting said centrifugal control according to the speed of the turbine runner in order to maintain a predetermined speed and power output of the turbine, a hydraulic accumulation chamber adjacent said governor operated valve and by-pass, a valve between said chamber and the hydraulically operated means for adjusting the runner blades, and means for remotely setting the maximum speed which the governor will permit.

12. In combination in a hydraulic turbine runner, a runner having adjustable blades, means for hydraulically adjusting said blades, and an intermittently opening by-pass valve for controlling the amount of hydraulic pressure utilized to adjust said blades and controlling the rate of opening of said valve centrifugally according to the speed of the runner.

13. In combination in a hydraulic turbine runner, a runner having adjustable blades, means for hydraulically adjusting said blades, an intermittently opening by-pass valve for controlling the amount of hydraulic pressure utilized to adjust said blades and controlling the rate of opening of said valve centrifugally according to the speed of the runner, and means of adjusting the maximum rate of opening of said valve.

14. In combination, a hydraulic turbine runner having a hollow hub, adjustable buckets mounted thereon, a hydraulically operated piston for adjusting said buckets with a by-pass around said pistons, means of applying hydraulic pressure to one side of said piston, a hydraulic accumulation chamber in the means for supplying hydraulic pressure, a valve controlling the passage of hydraulic fluid therethrough to the piston, a centrifugally operated by-pass valve and by-pass communicating with said hydraulic chamber and a centrifugally operated governor adapted to control said by-pass valve.

15. In combination, a hydraulic turbine runner having a hollow hub, adjustable buckets mounted thereon, a hydraulically operated piston for adjusting said buckets with a by-pass around said pistons, means of applying hydraulic pressure to one side of said piston, a hydraulic accumulation chamber in the means for supplying hydraulic pressure, a valve controlling the passage of hydraulic fluid therethrough to the piston, a centrifugally operated by-pass valve and by-pass communicating with said hydraulic chamber, and a centrifugally operated governor adapted to control said by-pass valve located in said hydraulic chamber.

16. In combination, a hydraulic turbine runner having a hollow hub, adjustable buckets mounted thereon, a hydraulically operated piston for adjusting said buckets with a by-pass around said pistons, means of applying hydraulic pressure to one side of said piston, a hydraulic accumulation chamber in the means for supplying hydraulic pressure, a valve controlling the passage of hydraulic fluid therethrough to the piston, a centrifugally operated by-pass valve and by-pass communicating with said hydraulic chamber, a centrifugally operated governor adapted to control said by-pass valve located in said hydraulic chamber, and a hollow runner shaft having an air chamber associated therewith.

17. In combination, a hydraulic turbine runner having a hollow hub, adjustable buckets mounted thereon, a hydraulically operated piston for adjusting said buckets with a by-pass around said pistons, means of applying hydraulic pressure to one side of said piston, a hydraulic accumulation chamber in the means for supplying hydraulic pressure, a valve controlling the passage of hydraulic fluid therethrough to the piston, a centrifugally operated by-pass valve and by-pass communicating with said hydraulic chamber, a centrifugally operated governor adapted to control said by-pass valve located in said hydraulic chamber, a hollow runner shaft having an air chamber associated therewith, and means for effecting communication between said piston and said air chamber for steadying the operation of said piston.

18. In combination, a hydraulic turbine runner having a hollow hub, adjustable buckets mounted thereon, a hydraulically operated piston for adjusting said buckets with a by-pass around said pistons, means of applying hydraulic pressure to one side of said piston, a hydraulic accumulation chamber in the means for supplying hydraulic pressure, a valve controlling the passage of hydraulic fluid therethrough to the piston, a centrifugally operated by-pass valve and by-pass communicating with said hydraulic chamber, a centrifugally operated governor adapted to control said by-pass valve located in said hydraulic chamber, a hollow runner shaft having an air chamber associated therewith, means for effecting communication between said piston and said air chamber for steadying the operation of said piston, and means remote from said runner for adjusting the maximum speed of said governor.

19. In combination, a hydraulic turbine runner having a hollow hub, adjustable buckets mounted thereon, a hydraulically operated piston for adjusting said buckets with a by-pass around said pistons, means of applying hydraulic pressure to one side of said piston, a hydraulic accumulation chamber in the means for supplying hydraulic pressure, a valve controlling the passage of hydraulic fluid therethrough to the piston, a centrifugally operated control said by-pass valve located in said hydraulic chamber, a hollow runner shaft having an air chamber associated therewith, means for effecting communication between said piston and said air chamber for steadying the operation of said piston, means remote from said runner for adjusting the maximum speed of said governor, and electrically operated means for adjusting said adjusting means.

20. In combination, a plurality of self closing runner buckets, a hub supporting said buckets, a hydraulically operated piston and piston rod adapted to simultaneously move said buckets to open position, a by-pass around said piston and piston rod, means of supplying hydraulic pressure for operating said piston, a hydraulic accumulation chamber interposed in said means, a valve controlling the passage of fluid from said chamber to said piston, a centrifugally operated valve controlling the exit of fluid from the by-pass to the hydraulic chamber.

21. In combination, a plurality of self closing runner buckets, a hub supporting said buckets, a hydraulically operated piston and piston rod adapted to simultaneously move said buckets to open position, a by-pass around said piston and piston rod, means for supplying hydraulic pressure for operating said piston, a hydraulic accumulation chamber interposed in said means, a valve controlling the passage of fluid from said chamber to said piston, a centrifugally operated valve controlling the exit of fluid from the by-pass to the hydraulic chamber, and means to drain surplus hydraulic fluid from behind the piston into the by-pass.

22. In combination, a plurality of self closing runner buckets, a hub supporting said buckets, a hydraulically operated piston and piston rod adapted to simultaneously move said buckets to open position, a by-pass around said piston and piston rod, means of supplying hydraulic pressure for operating said piston, a hydraulic accumulation chamber interposed in said means, a valve controlling the pasage of fluid from said chamber to said piston, a centrifugally operated valve controlling the exit of fluid from the by-pass to the hydraulic chamber, and an air cushion chamber in communication with the space behind the piston to form an air cushion.

23. In a hydraulic turbine, a runner having adjustable blades, hydraulic means for actuating said blades, and means controlled by the speed of the runner adapted to control the extent to which hydraulic means is applied to the operation of the runner blades.

24. In a hydraulic turbine, a runner having adjustable blades, hydraulic means for actuating said blades, means controlled by the speed of the runner adapted to control the extent to which hydraulic means is applied to the operation of the runner blades, said governor being in turn actuated by the current generated by a generator driven by the runner.

GEORGE A. BIGGS.